United States Patent
Stathis et al.

(10) Patent No.: US 10,698,111 B2
(45) Date of Patent: Jun. 30, 2020

(54) ADAPTIVE POINT CLOUD WINDOW SELECTION

(71) Applicant: Sikorsky Aircraft Corporation, Stratford, CT (US)

(72) Inventors: Christopher Stathis, Hamden, CT (US); Jason C. Derenick, Hamden, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 58 days.

(21) Appl. No.: 15/153,500

(22) Filed: May 12, 2016

(65) Prior Publication Data

US 2016/0334513 A1 Nov. 17, 2016

Related U.S. Application Data

(60) Provisional application No. 62/161,944, filed on May 15, 2015.

(51) Int. Cl.
*G01S 17/89* (2020.01)
*G06K 9/00* (2006.01)
(Continued)

(52) U.S. Cl.
CPC .............. *G01S 17/89* (2013.01); *B64D 45/04* (2013.01); *G01S 7/4808* (2013.01);
(Continued)

(58) Field of Classification Search
CPC .... F24F 11/0034; G06F 21/74; G08G 5/0043; G01S 17/89; G06K 9/36; G06K 2009/3291; G06K 9/00771; B64D 45/04; G06T 7/20

USPC .... 701/30.2, 1, 16; 348/E5.081, E5.086, 80, 348/143, 159, 207.99, 223.1; 250/559.07; 455/418; 356/451; 165/237; 1/1; 235/455; 358/486

See application file for complete search history.

(56) References Cited

U.S. PATENT DOCUMENTS 4,348,592 A * 9/1982 Kimura .................... G06K 9/36
250/559.07
5,267,296 A * 11/1993 Albert ...................... H04N 5/32
348/E5.086
(Continued)

FOREIGN PATENT DOCUMENTS

EP 2884305 A1 * 6/2015 ............. B64C 19/00

OTHER PUBLICATIONS

"Reduce Camera Shake Blurring" by Photo Shop, 6 pages, Apr. 10, 2014.*

(Continued)

*Primary Examiner* — Alexander G Kalinowski
*Assistant Examiner* — Sanjeev Malhotra
(74) *Attorney, Agent, or Firm* — Cantor Colburn LLP

(57) ABSTRACT

A method for imaging a moving object includes scanning a predetermined area with at least one distance sensor to form an image of a structure of a moving object using a safe sensing time window to periodically refresh the image. The images of the structure are compared to a known model of the structure to estimate rates of motion. A refined time window is determined based on the estimated rates of motion to monitor the moving object with increased accuracy and/or range compared to the safe time window.

20 Claims, 2 Drawing Sheets

(51) Int. Cl.
G06K 9/20 (2006.01)
G01S 17/08 (2006.01)
G01S 17/50 (2006.01)
G01S 7/481 (2006.01)
B64D 45/04 (2006.01)
G05D 1/06 (2006.01)
G06T 7/246 (2017.01)
G01S 17/933 (2020.01)
G01S 7/48 (2006.01)
G01S 17/58 (2006.01)

(52) U.S. Cl.
CPC ............ *G01S 7/4817* (2013.01); *G01S 17/08* (2013.01); *G01S 17/50* (2013.01); *G01S 17/933* (2013.01); *G05D 1/0684* (2013.01); *G06K 9/0063* (2013.01); *G06K 9/00208* (2013.01); *G06K 9/209* (2013.01); *G06T 7/251* (2017.01); *G01S 17/58* (2013.01); *G06T 2207/10028* (2013.01); *G06T 2207/10032* (2013.01); *G06T 2207/30212* (2013.01); *G06T 2207/30241* (2013.01); *G06T 2207/30252* (2013.01)

(56) References Cited

U.S. PATENT DOCUMENTS

| | | | | |
|---|---|---|---|---|
| 6,018,565 | A * | 1/2000 | Ergun | A61B 6/4405 348/E5.081 |
| 7,834,913 | B2 * | 11/2010 | Aoki | H04N 1/407 348/207.99 |
| 2006/0146377 | A1 * | 7/2006 | Marshall | G06T 3/4038 358/486 |
| 2008/0111895 | A1 * | 5/2008 | Aoki | H04N 1/407 348/223.1 |
| 2010/0267375 | A1 * | 10/2010 | Lemmon | H04M 1/72577 455/418 |
| 2011/0224840 | A1 * | 9/2011 | Vanek | G01S 17/58 701/1 |
| 2011/0235045 | A1 * | 9/2011 | Koerner | G02B 21/0056 356/451 |
| 2012/0261516 | A1 | 10/2012 | Gilliland et al. | |
| 2012/0290169 | A1 * | 11/2012 | Zeng | G01S 7/4026 701/30.2 |
| 2013/0242109 | A1 * | 9/2013 | van den Hengel | G08B 13/19645 348/159 |
| 2013/0242284 | A1 | 9/2013 | Zeng | |
| 2013/0282208 | A1 * | 10/2013 | Mendez-Rodriguez | G01S 17/89 701/16 |
| 2014/0379179 | A1 | 12/2014 | Goossen et al. | |
| 2015/0170526 | A1 * | 6/2015 | Wang | G08G 5/02 701/16 |
| 2015/0178535 | A1 * | 6/2015 | Bremer | G06K 7/10752 235/455 |
| 2015/0204556 | A1 * | 7/2015 | Kusukame | G01J 5/025 165/237 |
| 2015/0358533 | A1 * | 12/2015 | Tanaka | G02B 21/244 348/80 |
| 2016/0019764 | A1 * | 1/2016 | Takiguchi | G08B 13/19608 348/143 |
| 2016/0275801 | A1 * | 9/2016 | Kopardekar | G08G 5/0043 |

OTHER PUBLICATIONS

Extended European Search Report of European Patent Application No. 16169808.9, dated Sep. 20, 2016.

Sankalp, A, et al.: "Infrastructure-free shipdeck tracking for autonomous landing", 2013 IEEE International Conference on Robotics and Automation (ICRA); May 6-10, 2013; Karlsruhe, Germany, IEEE, US, May 6, 2013 (May 6, 2013), pp. 323-330, XP032506619, ISSN: 1050-4729, DOI: 10.1109/ICRA.2013.6630595, ISBN: 978-1-4673-5641-1 [retrieved on Oct. 13, 2013] * abstract *.

Jasiobedzki, P.: "Autonomous Satellite Rendezvous and Docking Using LIDAR and Model Based vision", SPIE, PO Box 10, Bellingham WA 98227-0010 USA, vol. 5798, May 19, 2005 (May 19, 2005), XP040204321, abstract; figures 2,3,4 * paragraphs [04.1]-[04.3], [04.4]-[0005] *.

Arora, S., "Infrastructure-free Shipdeck Tracking for Autonomous Landing," 2013 IEEE International Concerence on Robotics and Automation (ICRA); May 6-10, 2013, Karlsruhe, Germany, IEEE, US, pp. 323-330.

Communication Pursuant to Article 94(3) for European Application No. 16169808.9 dated Mar. 11, 2019.

Jasiobedzki, P., "Autonomous Satellite Rendezvous and Docking Using LIDAR and Model Based Vision," May 19, 2005, Spaceborne Sensors II, edited by Peter Tchoryk, Brian Holz, Proc. of SPIE, vol. 5798, pp. 54-65.

Communication Pursuant to Article 94(3) for EP Application No. 16169808.9 dated Dec. 12, 2019.

* cited by examiner

ABAPTIVE POINT CLOUD WINDOW SELECTION

CROSS-REFERENCE TO RELATED APPLICATION

This application claims the benefit of priority under 35 U.S.C. § 119(e) to U.S. Provisional Application No. 62/161,944, filed May 15, 2015, which is incorporated herein by reference in its entirety.

BACKGROUND OF THE INVENTION

1. Field of the Invention

The present disclosure relates to tracking systems, and more particularly to real-time tracking of moving objects.

2. Description of Related Art

Many scenarios involve the detection and tracking of movement of various objects. For example, a sequence of images of a scene captured over a brief period of time may be evaluated to identify a particular object that is visible in several sequential images, and based on various geometric properties of the scene, the movement of the object through the scene over the captured time period may be tracked. Scanning LIDAR can be used for these purposes to detect movement of the object. However, a "ghosting" or blur effect occurs when subsequent scan lines in the point cloud are derived from measurements of the object while in motion, similar to motion blur when a photograph exposure is long enough for the subject to noticeably move during the exposure. This severely limits the amount and quality of data available for processing at each frame. This data limitation can be problematic for some applications such as tracking at long range where single frames/scan lines may be too sparse to be useful.

Such conventional methods and systems have generally been considered satisfactory for their intended purpose. However, there is still a need in the art for systems and methods with a higher level of feature extraction. The present disclosure provides a solution for this need.

SUMMARY OF THE INVENTION

A method for imaging a moving object includes scanning a predetermined area with at least one distance sensor to form an image of a structure of a moving object using a safe sensing time window to periodically refresh the image. The images of the structure are compared a known model of the structure to estimate rates of motion. A refined time window is determined based on the estimated rates of motion to monitor the moving object with increased accuracy and/or range compared to the safe time window.

The distance sensor can be a LIDAR sensor providing point cloud data as sequential image frames. The refined time window can be a time scale for collecting the maximum number of clear scans of the moving object per time frame.

The method can further include continuously scanning the area surrounding the moving object and updating a dynamic feedback module with images of the moving object to further track the moving object.

Forming an image of the structure may include detecting edges of the object and forming boundaries of the object. The method may optionally include determining a landing trajectory using data acquired with the refined time window.

In one embodiment, the direction sensor is located on an aircraft and the moving object is a waterborne ship. A processing module is used to automatically control the aircraft to land on a deck of the ship in accordance with the generated landing trajectory. The distance sensor can detect the moving object at 2500 ft. or greater.

A system for imaging a moving object includes a distance sensor. A processing module is operatively connected to the distance sensor and includes machine readable instructions that, cause the module to scan a predetermined area with at least one distance sensor and form an image of a structure of a moving object using a safe sensing time window to periodically refresh the image. The images of the structure are compared to a known model of the structure to estimate rates of motion and a refined time window is determined based on the estimated rates of motion to monitor the moving object for increased accuracy and/or range compared to the safe time window These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
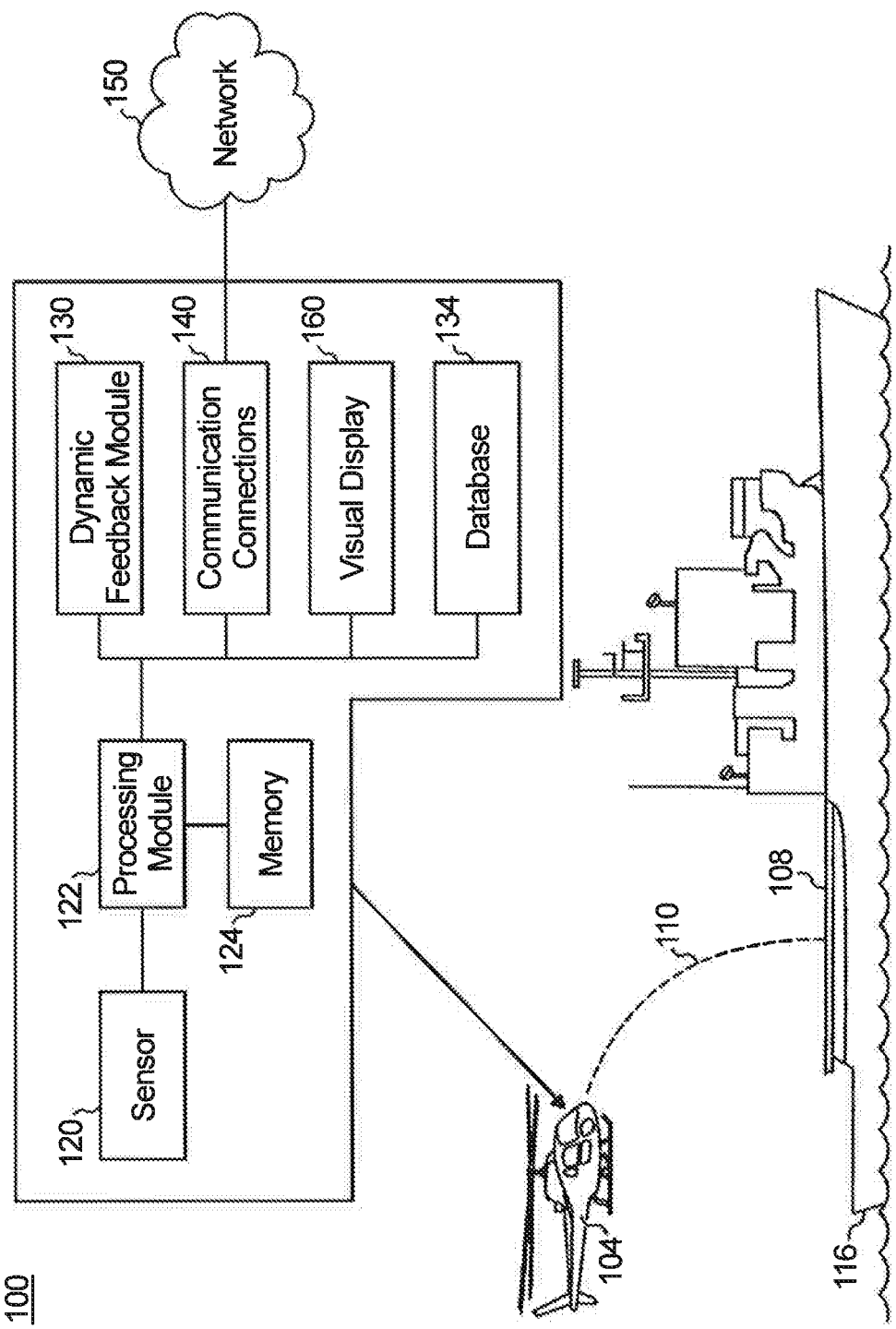
FIG. 1 is a schematic view of an exemplary embodiment of a system for adaptive point cloud window selection constructed in accordance with the present disclosure, showing the system in communication with an aircraft.

Reference will now be made to the drawings wherein like reference numerals identify similar structural features or aspects of the subject disclosure. For purposes of explanation and illustration, and not limitation, a partial view of an exemplary embodiment of a method and system for imaging a moving object in accordance with the disclosure is shown in FIG. 1 and is designated generally by reference character 100. Other embodiments of the system and method in accordance with the disclosure, or aspects thereof, are provided in FIG. 2, as will be described. Systems and methods described herein can be used for adaptive point cloud window selection, e.g., for finding aircraft landing trajectory using laser imaging (LIDAR).

Many scenarios involve an automated evaluation of images of an environment to detect the presence of moving objects and identify the position, size, orientation, velocity, and/or acceleration of the moving objects. With reference to FIG. 1, one exemplary embodiment can include determining a landing trajectory 110 for an aircraft 104 onto a deck 108 of a waterborne ship 116. Another example may include two aircraft aligning flight paths for in flight fueling. Another example includes motion tracking in a transit environment, including for automobiles, bicycles and pedestrians to facilitate obstacle avoidance. In each of the examples the analysis may be done in realtime or near-realtime and may involve the capturing of images. Those skilled in the art will readily appreciate that the system and method described herein are suitable for various other applications wherein detection and tracking of a moving object are useful.

With continued reference to FIG. 1, a system 100 for imaging a moving object is shown. The system 100 is shown operatively connected to the aircraft 104, however it will be understood that the system 100 can be used as described in any of the preceding examples and can be remotely connected to the aircraft 104. The system 100 includes a range sensor 120 operatively connected to a processing module 122 connected to a memory 124. The range sensor 120 can include a LIDAR capturing device, which emits a set of focused, low-power beams of light of a specified wavelength that detects and records the reflection of wavelengths of light from various objects. The LIDAR data can be used to generate a LIDAR point cloud, representing the LIDAR points of light reflected from the object. By capturing and evaluating LIDAR point data over a set time period, a representation of the relative position of a moving object (e.g., ship 116) can be found.

The system 100 and method 200 (shown in FIG. 2) described herein can be used to determine an optimal time window to capture images of the moving object and more specifically, determining the optimal time window to view the point data from the LIDAR. The system 100 further includes a dynamics feed module 130 and a database 134 of known structures, described in further detail below. Communication connections 140 may be included in the system 100, for example, a modem, an integrated network interface, a radio interface, or the like. Communication connections 140 may include a wired or wireless communication to transmit and receive communication. For example, as shown, communication connections 140 may be connected to a network 150 and thus be operated remotely, for example, in unmanned aerial vehicles. The system 100 further includes a visual display 160 to display the point cloud data being imaged. Those skilled in the art will recognize that system may include additional features and/or functionality not shown and described without departing from the scope of the present disclosure.

Figure 2:
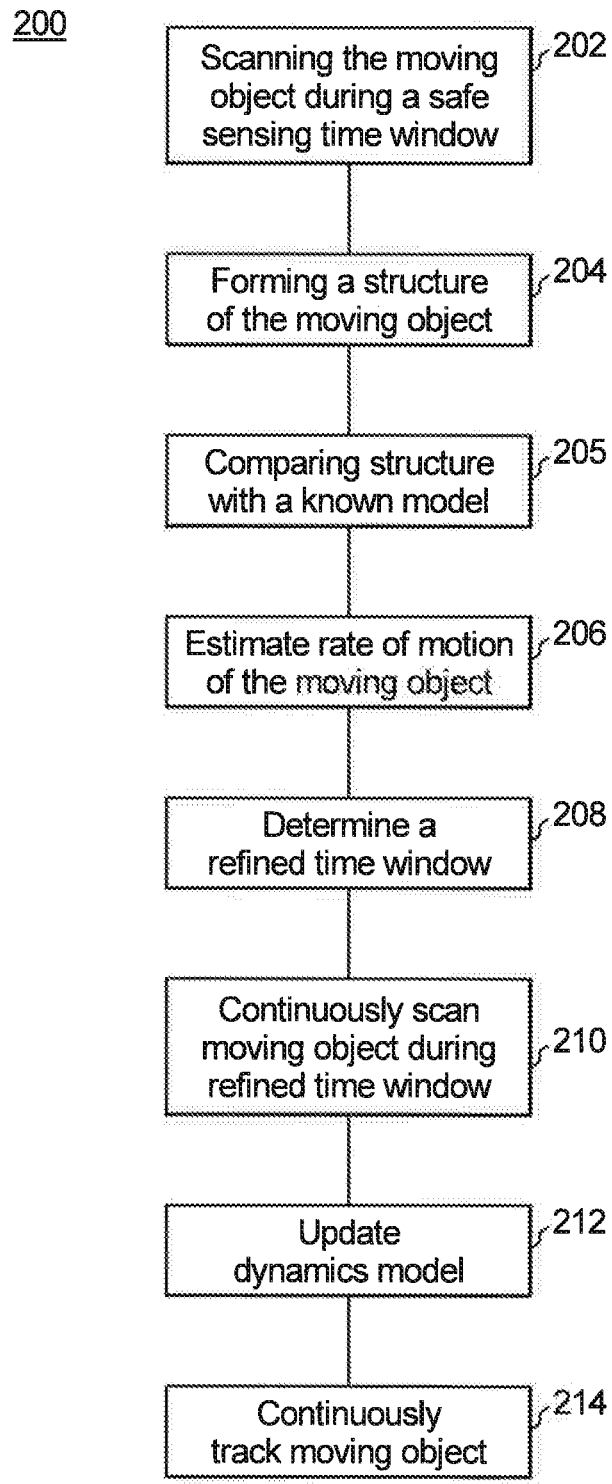
FIG. 2 is a flow chart showing method steps of employing the system of FIG. 1.

With reference to FIG. 2, the method 200 may be implemented, e.g., as a set of instructions stored in the memory of the system that, when executed by the processing module, cause the module to operate according to the steps herein. The method 200 begins at executing the instructions on the module, e.g., module 122, and requesting a LIDAR scan from sensor, e.g., sensor 120, of a moving object, e.g., a ship 106, to extract a structure of the moving object using a safe sensing time window as shown in boxes 202, 204. A safe sensing time window is determined based on a model of the motion of the tracked object. The model is used to compute the motion of the tracked object that occurs over the period of time required to produce a single scan of the object. The safe sensing time window is then selected according to the maximum acceptable motion of the object with respect to blur effects that accumulate in the aggregate image, which may consist of many complete scans collected in succession. The maximum acceptable motion, or in others words, the tolerance for blur effects in successive aggregate images, is considered a tunable parameter that may be relaxed or constrained to suit the application. As shown in box 205, during the safe sensing time window the moving object is scanned using the LIDAR sensor to compare the received images with a known model of the moving object. In other words, as the images are received, the module compares the received images with images stored in database, e.g., database 134, to verify the moving object is the desired structure. Once the moving object is clearly identified, the images are used to estimate rates of motion, as shown in box 206. Using the example above, a waterborne ship is moving/rolling with the waves of the ocean. Each image is compared and estimation of the speed of the ship can be determined based on the variation of movement of the ship with each image. As shown in box 208, based on the movement detected, a refined time window is determined by the module to monitor the moving object for increased accuracy and range. In typical scenarios using LIDAR to track a moving object, 'ghosting' or blurring of the images results in less reliable detection. However, defining a time span to integrate with the LIDAR (i.e. scan the moving object) based on the estimated motion rates and receive continuous point cloud data avoids the challenges of typical systems and results in a more reliable and accurate depictions of the moving object. The refined time window is a suitable or optimal time scale for collecting clear scans of the moving object based on movement of the object.

Once the refined time window is determined, the module directs the LIDAR sensor to continuously scan the moving object within the refined time window, as shown in box 210. The scans received are inputted into a dynamics feed module e.g., dynamics feedback module 130, as shown in box 212, and are used to continuously track the moving object, as shown in box 214, for various applications, including calculating a landing trajectory. For example, the module can measure the pitch rate or roll rate of the waterborne ship and can convert each image frame into x, y, z coordinates to determine a suitable landing trajectory. Using LIDAR and determining the refined time window allows the LIDAR to accurately create a three-dimensional model of the moving object at 2500 ft. or greater.

As will be appreciated by those skilled in the art, aspects of the present disclosure may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is intended to provide a brief, general description of an illustrative and/or suitable exemplary environment in which embodiments of the above described present invention may be implemented. FIG. 1 is exemplary of a suitable environment and is not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

The methods and systems of the present disclosure, as described above and shown in the drawings, provide for point cloud window selection with superior properties including adapting the window selection based on classification of a moving object. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method for an aircraft imaging a watercraft for a landing trajectory, the steps comprising:
    scanning, by the aircraft oriented at a vertical distance above the watercraft, a predetermined area of the watercraft being configured to move in a three-dimensional space while in water with at least one distance sensor to form an image of a structure of the watercraft using a safe sensing time window to periodically refresh the image, wherein the safe sensing time window used is selected according to a blur effect tolerance, wherein the safe sensing time window is further selected according to a maximum acceptable motion of the watercraft;
    comparing, by the aircraft, images of the structure being configured to move in the three-dimensional space while in the water to a known model of the structure to estimate rates of motion for the structure;
    determining, by the aircraft, a refined time window based on the estimated rates of motion to monitor the watercraft for increased accuracy and/or range compared to the safe sensing time window, wherein determining the refined time window based on the estimated rates of motion to monitor the watercraft for increased accuracy and/or range compared to the safe sensing time window comprises accounting for moving waves affecting the watercraft;
    during the refined time window previously determined, measuring a pitch rate or a roll rate for the watercraft; and
    determining by the aircraft, the landing trajectory for the aircraft using data acquired with the refined time window based on the pitch rate or the roll rate for the watercraft.

2. The method of claim 1, wherein the refined time window is a time scale for collecting the maximum number of clear scans of the watercraft.

3. The method of claim 1, wherein the distance sensor is a single LIDAR sensor providing point cloud data as sequential image frames.

4. The method of claim 1, further comprising continuously scanning the area surrounding the watercraft and updating a dynamic feedback module with images of the watercraft to continuously track the watercraft.

5. The method of claim 1, wherein forming an image of the structure includes detecting edges of the object and forming boundaries of the object.

6. The method of claim 1, wherein comparing the images of the structure to the known model of the structure to estimate the rates of motion for the structure comprises comparing the images of the structure from the safe sensing time window to stored images in a database to verify that the watercraft is a desired structure.

7. The method of claim 1, wherein: the at least one direction sensor is located on the aircraft, and the at least one direction sensor on the aircraft measures the pitch rate or the roll rate for the watercraft during the refined time window; further comprising using a processing module to automatically control the aircraft to land on a deck of the ship in accordance with the landing trajectory.

8. The method of claim 1, wherein the distance sensor can detect the watercraft at 2500 feet or greater.

9. A system of an aircraft for imaging a watercraft for a landing trajectory, comprising:
a distance sensor of the aircraft; and
a processing module of the aircraft operatively connected to the distance sensor includes machine readable instructions that cause the module to:
scan, by the module on board the aircraft oriented at a vertical distance above the watercraft, a predetermined area of the watercraft being configured to move in a three-dimensional space while in water with at least one distance sensor and form an image a structure of the watercraft using a safe sensing time window to refresh the image, wherein the safe sensing time window used is selected according to a blur effect tolerance, wherein the safe sensing time window is further selected according to a maximum acceptable motion of the watercraft;
compare, by the module on board the aircraft, the images of the structure being configured to move in the three-dimensional space while in the water with a known model to estimate rates of motion of the structure;
determine, by the aircraft, a refined time window based on the estimated rates of motion to monitor the watercraft for increased accuracy and/or range compared to the safe time window, wherein determine the refined time window based on the estimated rates of motion to monitor the watercraft for increased accuracy and/or range compared to the safe sensing time window comprises accounting for moving waves affecting the watercraft;
during the refined time window previously determined, measure a pitch rate or a roll rate for the watercraft; and
determine, by the aircraft, the landing trajectory for the aircraft using data acquired with the refined time window based on the pitch rate or the roll rate for the watercraft.

10. The system of claim 9, wherein the distance sensor is a single LIDAR sensor providing point cloud data as sequential image frames.

11. The system of claim 9, further comprising a dynamic feedback module continuously updated with images of the watercraft to continuously track the watercraft.

12. The system of claim 9, wherein the refined time window is a time scale for collecting the maximum number of clear scans of the watercraft.

13. The system of claim 9, wherein the module is configured to form an image of the structure by detecting edges of the object and forming boundaries of the object.

14. The system of claim 9, wherein comparing the images of the structure to the known model of the structure to estimate the rates of motion for the structure comprises comparing the images of the structure from the safe sensing time window to stored images in a database to verify that the watercraft is a desired structure.

15. The system of claim 9, wherein: the at least one direction sensor is located on the aircraft, the at least one direction sensor on the aircraft measures the pitch rate or the roll rate for the watercraft during the refined time window, and the processing module is configured to automatically control the aircraft to land on a deck of the ship in accordance with the landing trajectory.

16. The system of claim 9, wherein the distance sensor can detect the watercraft at 2500 feet or greater.

17. A method for an aircraft imaging a watercraft for a landing trajectory, the steps comprising:
scanning, by the aircraft oriented at a vertical distance above the watercraft, a predetermined area of the watercraft being configured to move in a three-dimensional space while in water with at least one distance sensor to form an image of a structure of the watercraft using a safe sensing time window to periodically refresh the image, wherein the safe sensing time window used is selected according to a blur effect tolerance, wherein: the safe sensing time window is further selected according to a maximum acceptable motion of the watercraft, the distance sensor is a LIDAR sensor providing point cloud data as sequential image frames, and the direction sensor is located on an aircraft;
comparing, by the aircraft, images of the structure being configured to move in the three-dimensional space while in the water to a known model of the structure to estimate rates of motion for the structure;
determining, by the aircraft, a refined time window based on the estimated rates of motion to monitor the watercraft for increased accuracy and/or range compared to the safe sensing time window, wherein determining the refined time window based on the estimated rates of motion to monitor the watercraft for increased accuracy and/or range compared to the safe sensing time window comprises accounting for moving waves affecting the watercraft;
during the refined time window previously determined, measuring a pitch rate or a roll rate for the watercraft;
determining, by the aircraft, the landing trajectory using data acquired with the refined time window based on the pitch rate or the roll rate for the watercraft; and
using, by the aircraft, a processing model to automatically control the aircraft to land on a deck of the ship in accordance with the landing trajectory.

18. The method of claim 1, wherein the tolerance is a tunable parameter.

19. The system of claim 9, wherein the tolerance is a tunable parameter.

20. The method of claim 17, wherein the tolerance is a tunable parameter.

* * * * *